US005572764A

United States Patent [19]

Fernandes et al.

[11] Patent Number: 5,572,764

[45] Date of Patent: Nov. 12, 1996

[54] ARTICULATED WINDSHIELD WIPER BLADE ASSEMBLY

[75] Inventors: Michel Fernandes, E. Freetown; Brian J. Driscoll, Hanover, both of Mass.; Peter H. Jeffer, New York, N.Y.

[73] Assignee: New-View Windshield Wiper, Inc., New York, N.Y.

[21] Appl. No.: 634,346

[22] Filed: Apr. 18, 1996

[51] Int. Cl.$^6$ .................... B60S 1/38; B60S 1/04

[52] U.S. Cl. .................... 15/250.361; 15/250.451; 15/250.48; 15/250.33; 15/250.44

[58] Field of Search .................... 15/250.48, 250.40, 15/250.41, 250.33, 245, 250.451, 250.46, 250.44, 250.452, 250.453, 250.31, 250.361

[56] References Cited

U.S. PATENT DOCUMENTS

| | | | |
|---|---|---|---|
| 1,973,366 | 9/1934 | Anderson | 15/250.33 |
| 2,179,451 | 11/1939 | Horton | 15/250.40 |
| 3,766,591 | 10/1973 | Soito | 15/245 |
| 3,820,188 | 6/1974 | Moorhead et al. | 15/250.453 |
| 4,698,874 | 10/1987 | Fritz, Jr. | 15/250.48 |
| 4,704,762 | 11/1987 | Beneteau et al. | 15/250.48 |
| 4,722,112 | 2/1988 | Schoub et al. | 15/250.451 |
| 5,392,488 | 2/1995 | Li | 15/250.48 |

FOREIGN PATENT DOCUMENTS

| | | | |
|---|---|---|---|
| 1023024 | 12/1952 | France | 15/250.33 |
| 59350 | 12/1954 | France | 15/250.48 |
| 4035336 | 5/1992 | Germany | 15/250.48 |
| 138048 | 10/1981 | Japan | 15/250.451 |
| 636231 | 4/1950 | United Kingdom | 15/250.48 |
| 2202134 | 9/1988 | United Kingdom | 15/250.48 |

*Primary Examiner*—Gary K. Graham
*Attorney, Agent, or Firm*—Lyon, P.C.

[57] ABSTRACT

An articulated twin spline windshield wiper blade assembly for acceptance in the claws of a conventional windshield wiper arm assembly comprises a relative high durometer polymeric female spline having a circular channel therein for journaling of a male spline of a relatively low durometer elastomeric material. The female spline has a pair of oppositely directed flanges that are accepted in the claws of the wiper arm assembly and lie in a plane containing the central axis of the circular channel therein to minimize the moment of inertia of the female spline about an axis extending at a right angle to the central axis of the channel therein and parallel to a surface to be wiped. The cylindrical channel of the female spline comprises arcuate legs having circumferentially spaced stops, respectively, which are flared radially outwardly to limit rotation of the male spline and serve as a weather shield to protect the blade assembly against the infusion of ice and debris and utilize windage to apply a downward force against the surface being wiped.

4 Claims, 1 Drawing Sheet

ARTICULATED WINDSHIELD WIPER BLADE ASSEMBLY

BACKGROUND OF THE INVENTION

Automotive windshield wiper blades are required to perform flawlessly in widely varying applications, for example, on curved as well as flat windshields. However, the problem of wiping the severely curved windshields of the latest automobiles has not heretofore been solved. The problem is rooted in the fact that flexure of the elastomeric material of the blade has heretofore been utilized by most wiper blades to position the wiping edge of the wiper blade on the surface to be wiped. Such flexure is about an axis extending parallel to the wiping edge. However, when wiping a curved windshield the blade must also flex about an axis extending at a right angle to the wiping edge to accommodate windshield curvature.

Articulated wiper blade assemblies that utilize rotation of a wiping blade relative to a carrier are known, for example, the wiper blade assembly disclosed in U.S. Pat. No. 4,698,874. Such blade assemblies exhibit improved performance over non-articulated blades on curved surfaces, but fail to solve the aforesaid problem since the carrier of such known assemblies exhibit a relatively high moment of inertia about a transverse axis that attenuates flexure of the blade assembly resulting in disproportionate unit pressure on the wiping blade as it passes over curved portions of the windshield.

SUMMARY OF THE INVENTION

The invention relates to an articulated windshield wiper blade assembly having a relatively low moment of inertia about a transverse axis extending at a right angle to the wiping edge of the wiper blade and parallel to the windshield so as to be capable of wiping severely curved windshields. The articulated wiper of the present invention exhibits materially improved wiping performance by maximizing flexibility of the wiper blade assembly about said transverse axis during the wiping stroke.

More specifically, a conventional wiper arm and claw system supports a full-length wiper blade assembly. The blade assembly comprises interlocked male and female splines. The male spline pivots relative to the female spline about an axis that extends parallel to the wiping edge of the male spline and to the surface being wiped. Support flanges on the female spline are accepted in the claws of a conventional wiper blade holder.

In accordance with the present invention, the support flanges on the female spline lie in a plane containing the axis of rotation of the male spline to minimize the moment of inertia of the female spline about an axis extending at a right angle to said axis of rotation and parallel to the surface being wiped thereby to maximize flexibility of the blade assembly and facilitate wiping of the curved surface of a windshield.

Moreover, orientation of the axis of rotation of the male spline in the plane containing the support flanges of the female spline minimizes the overall height of the blade assembly, thereby to minimize lift due to windage.

Further, radially outwardly flared stops on legs of the female spline maximize protection of the blade assembly against the infusion of ice and debris.

The female spline of the twin spline blade is made of relatively high durometer polymeric material, having a durometer of approximately 70 to 80 on the Shore "D" scale, to insure structural integrity. The male spline is made of relatively lower durometer elastomeric material having a durometer of approximately 55 to 65 on the Shore "A" scale to maximize wiping efficiency.

DETAILED DESCRIPTION OF THE PREFERRED EMBODIMENT(S)

Figures 1, 2, 3:
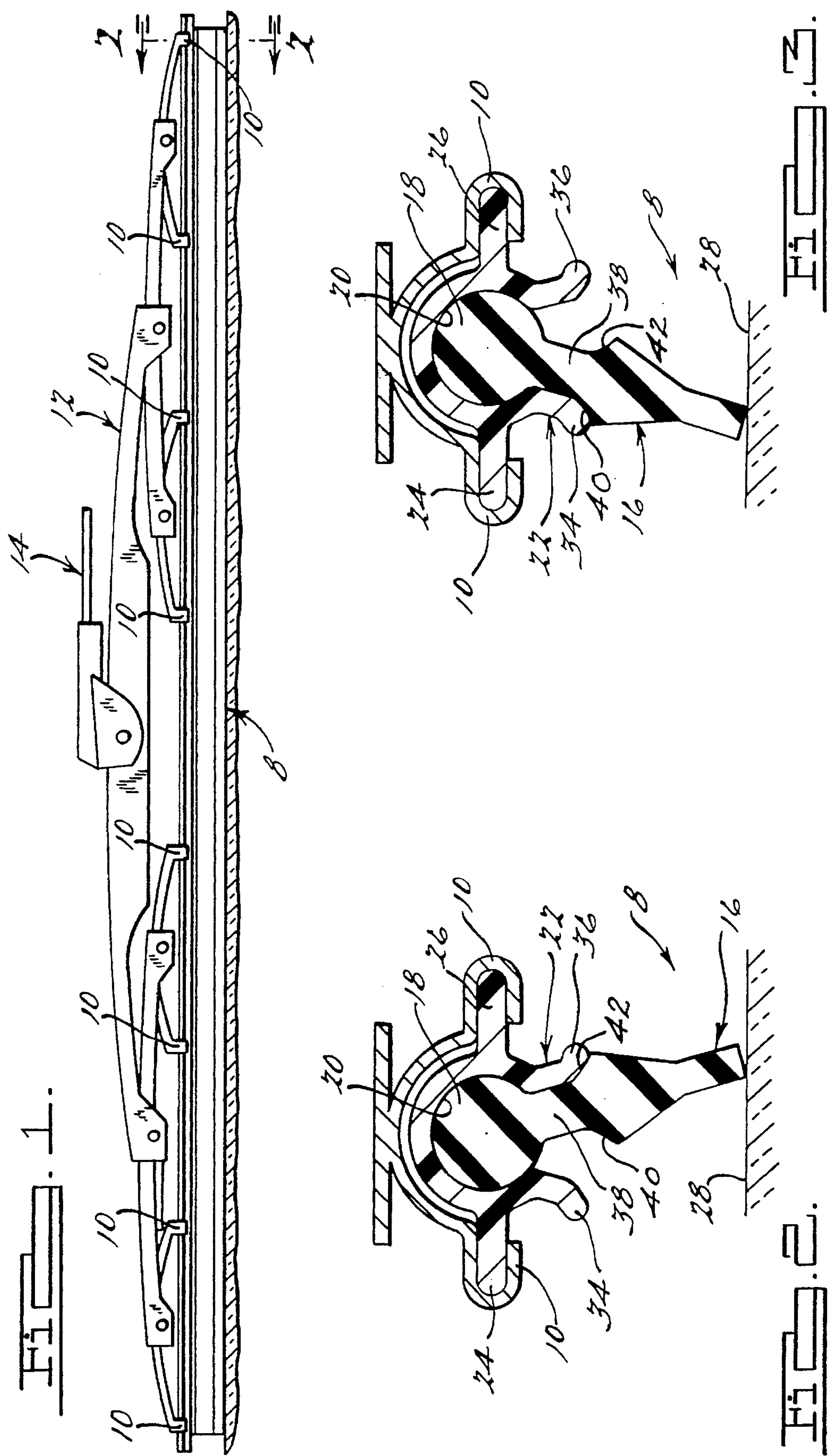
FIG. 1 is an elevational view of a windshield wiper arm and blade holder utilizing the articulated twin spline wiper blade assembly of the present invention.
FIG. 2 is a cross-sectional view taken along the line 2—2 of FIG. 1.
FIG. 3 is a view similar to FIG. 2 showing rotation of the male spline relative to the female spline of the twin spline wiper blade assembly.

An articulated twin spline wiper blade assembly 8, in accordance with a preferred constructed embodiment of the instant invention, is supported in claws 10 of a conventional blade holder 12. The blade holder 12 is pivotally connected to a wiper arm 14 in the conventional manner.

The twin spline wiper blade assembly 8 comprises a male spline 16 having a right circular cylindrical upper portion 18 that is journaled in a right circular cylindrical channel 20 of a female spline 22.

The female spline 22 has a pair of diametrically spaced radially outwardly extending flanges 24 and 26 on opposite sides, respectively, of the cylindrical channel 20 therein that are accepted in the reentrantly folded claws 10 of the blade holder 12.

In accordance with the present invention, the flanges 24 and 26 on the female spline 22 lie in a plane containing the central axis of the cylindrical channel 20 thereof so as to minimize the moment of inertia of the female spline 22 about a transverse axis extending parallel to a surface 28 to be wiped. The cylindrical channel 20 of the female spline 22 is discontinuous so as to define a pair of legs or stops 34 and 36 on opposite sides of a slot communicating with said channel, said legs are circumferentially spaced from one another at, for example, 30 degrees. Rotation of the male spline 16 relative to the female spline 22 is limited by engagement of a neck 38 and shoulders 40 or 42 on the male spline 16 with one or the other of the stops 34 or 36 on the female spline 22, respectively.

It is to be noted that the stops 34 and 36 are flared radially outwardly to protect the channel 20 of the female spline 22 against ice and debris accumulation as well as to utilize windage to apply a downward force against the surface 28 being wiped.

From the forgoing, it should be apparent that the female spline 22 of the blade 8 can be made from relatively high durometer material so as to provide a stable journal box for journalling of the male spline 16, yet flex about a transverse axis to wipe a curved surface.

While the preferred embodiment of the invention has been disclosed, it should be appreciated that the invention is susceptible of modification without departing from the scope of the following claims.

We claim:

1. An articulated twin spline windshield wiper blade assembly for acceptance in claws of a conventional windshield wiper arm assembly, said blade assembly comprising:

an elongated relatively high durometer polymeric female spline having a cylindrical channel therein, a slot communicating with said channel and a pair of elongated oppositely radially outwardly directed flanges thereon lying in a plane containing the central axis of the cylindrical channel and engageable in the claws of the windshield wiper arm assembly, said flanges extending along the length of said female spline; and a relatively low durometer elastomeric male spline of durometer less than said female spline, said male spline having an upwardly extending neck passing through said slot and terminating in a cylindrical portion complimentary to the channel in said female spline so as to be journaled for rotation therein about said axis and a wiping portion coupled with said neck with a pair of spaced wiping edges engageable, alternately, with a surface to be wiped upon rotation of said cylindrical portion of the male spline relative to said cylindrical channel of the female spline about said axis.

2. A wiper blade assembly in accordance with claim 1, wherein the female spline of said blade assembly is of polymeric material of 70–80 durometer on the Shore "D" scale and the male spline is of elastomeric material of 55–65 durometer on the Shore "A" scale.

3. A wiper blade in accordance with claim 1 wherein said female spline comprises a pair of circumferentially spaced arcuate legs having radially outwardly flared stops thereon, respectively, engageable with said male spline to limit rotation thereof and effect a bias thereon toward the surface being wiped due to windage.

4. A wiper blade assembly in accordance with claim 3, wherein the male spline has shoulders on opposite sides of the neck portion thereof and wherein the stops on said female spline form a protective weather shield by interlocking with the neck and shoulders of the male spline to prevent accumulation of ice and debris in the channel.

* * * * *